(No Model.) 2 Sheets—Sheet 1.

C. T. SCHOEN.
MODE OF MAKING CAR SPRING PLATES.

No. 379,544. Patented Mar. 13, 1888.

WITNESSES
F. L. Ourand
A. C. Rawlings

INVENTOR.
Charles T. Schoen
by Wm. H. Fincsell
his Attorney.

(No Model.) 2 Sheets—Sheet 2.

C. T. SCHOEN.
MODE OF MAKING CAR SPRING PLATES.

No. 379,544. Patented Mar. 13, 1888.

WITNESSES,
F. L. Ourand
A. C. Rawlings

INVENTOR,
Charles T. Schoen,
by Wm. H. Finckel,
his Attorney.

UNITED STATES PATENT OFFICE.

CHARLES T. SCHOEN, OF PHILADELPHIA, PENNSYLVANIA, ASSIGNOR TO THE CHARLES SCOTT SPRING COMPANY.

MODE OF MAKING CAR-SPRING PLATES.

SPECIFICATION forming part of Letters Patent No. 379,544, dated March 13, 1888.

Application filed January 10, 1888. Serial No. 260,336. (No model.)

*To all whom it may concern:*

Be it known that I, CHARLES T. SCHOEN, a citizen of the United States, residing at Philadelphia, in the county of Philadelphia and State of Pennsylvania, have invented a certain new and useful Improvement in Processes of Making Plates for Car-Springs, of which the following is a full, clear, and exact description.

The object of this invention is to produce in an economical and expeditious manner the caps or plates for the spiral or coiled cluster springs used in railway-car trucks. Hitherto, until comparatively recently, such caps have been usually cast; but their cost has been large and they have been fragile. Wrought metal—such as sheet or plate steel or iron—possesses the requisite strength, lack of frangibility, and comparative inexpensiveness to adapt it most admirably to such uses; but I have been able to utilize it in a merchantable or commercial way only after extensive experiments, for I esteem it a prime requisite of such plates or caps that each (the top and bottom) shall be in one piece, and that their cavities for the reception of the connecting bolt or bolts made integral therewith shall conceal or inclose the bolt as the top plate descends under compression of the springs. Should the bolt-receiving cavity be made as a separate piece this separability is a disadvantage in assembling, packing, and transporting. Primarily, therefore, my invention seeks to form this bolt-receiving cavity integral with the wrought plate. Utilizing the capacity of such wrought metal to be drawn or upset by dies, I have invented a method of die-forming or constructing car-spring plates or caps with their bolt-receiving cavities integral, as I will now proceed particularly to set forth and claim.

Figure 1:
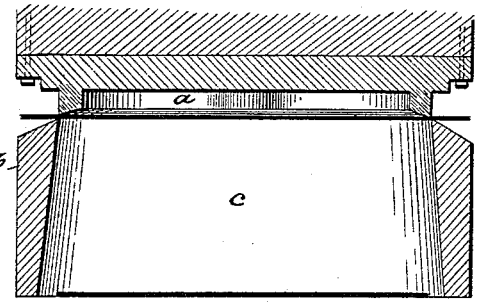
Figure 2:
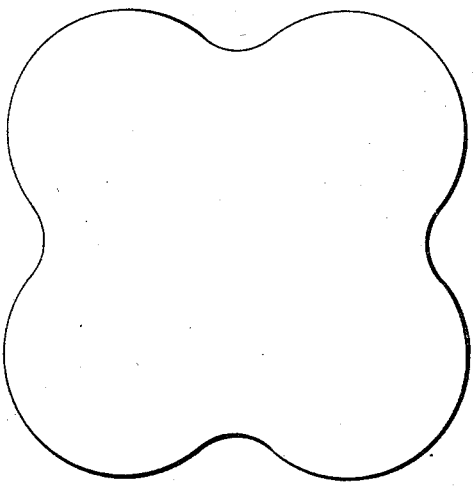
Figure 3:
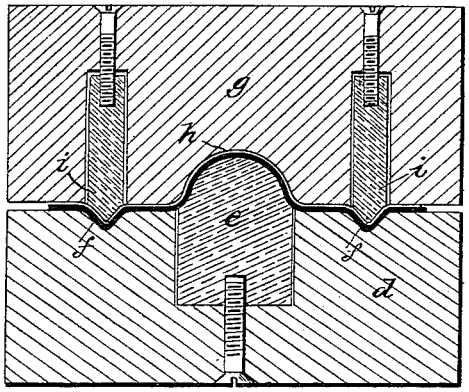
Figure 4:
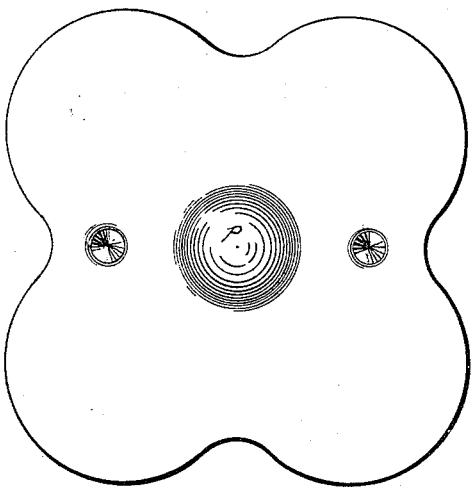
Figure 5:
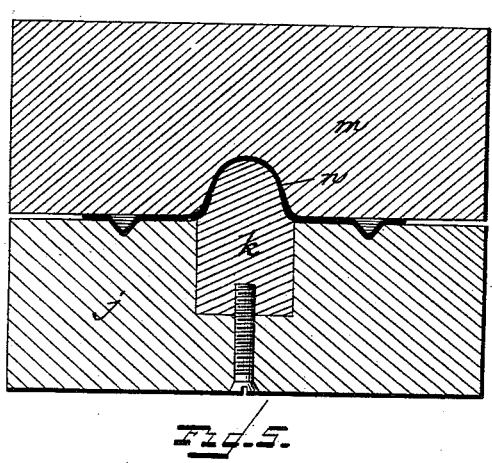
Figure 6:
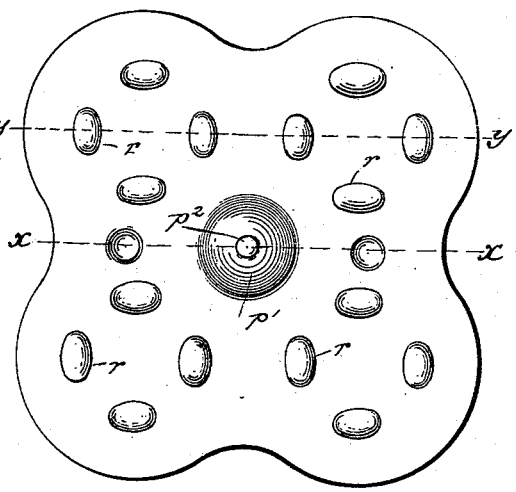
Figure 7:
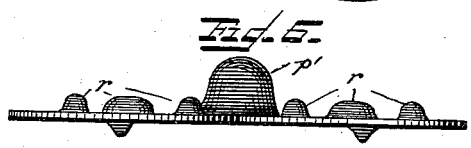
Figure 9:
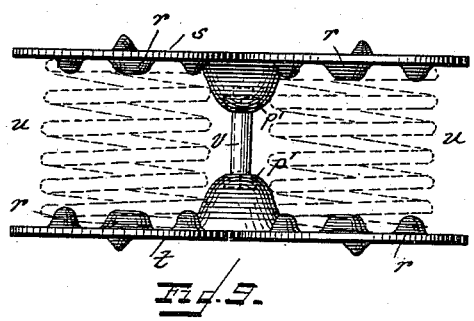
Figure 8:
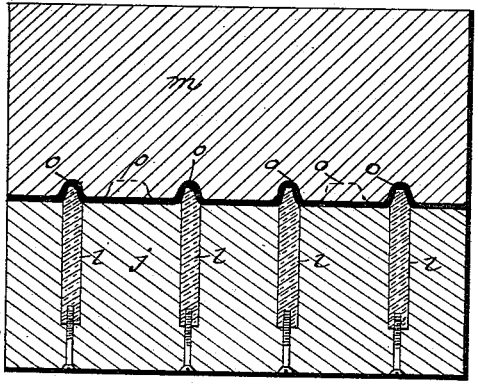

In the accompanying drawings, in the several figures of which like parts are similarly designated, Figure 1 is a vertical section of a cutter, and Fig. 2 is its product or the blank. Fig. 3 is a vertical section of the first set of dies, and whose product is shown in Fig. 4. Fig. 5 is a vertical section of the finishing-dies, and Fig. 6 their product or the finished plate, the dotted line in this figure representing the plane in which the section of Fig. 5 is taken. Fig. 7 is a side or edge view of the plate. Fig. 8 is a section of the finishing-dies taken on a plane that would be indicated by line *y y* of Fig. 6; and Fig. 9 is an elevation of one kind of car spring to which the plates are applicable, the coils being shown in dotted lines to make plain the plates.

I wish here to state that while I believe the mechanism shown herein for practicing my invention is the simplest and best, and that the article to be made can be produced most cheaply and expeditiously and accurately by these means, still it is within the scope of my invention to employ other mechanism and to use composite dies for performing two or more of the operations necessary in practicing my invention. Moreover, my invention is applicable to the production of plates or caps of other shapes than that shown in the drawings herein and where more than one bolt-receiving cavity and bolt are used. With this statement, then, I will proceed to describe my invention as carried out in and by the instrumentalities herein delineated.

The plates are cut in outline and shape for the desired purpose by dies consisting of the male cutter *a* and its female complement *b*, arranged in a suitable press. The female die is hollow or made with a throat, *c*, so as to discharge the cut plates from below. This cutting is done while the sheet or plate metal is cold, as in that condition the cutting-dies work best. The blank is next heated to render it more ductile, and is then subjected to the action of the dies shown in Fig. 3, in which the lower die, *d*, is constructed with a punch, *e*, and recesses *f*, and the upper die or matrix, *g*, is made with a cavity, *h*, and projections or teats *i*, respectively, complementary to the punch and recesses of the lower die. The punch *e* and cavity *h* are about twice the diameter of the finished article and longitudinally about half or a little more than that of the finished article. The parts *f* and *i* turn out their work complete, or as it is to be in the finished product. The thus-treated blank is then reheated and subjected to the action of the dies shown in Fig. 5, in which the lower die, *j*, is provided with a punch, *k*, of less diameter and greater length by about a half than the punch e, and teats or projections r in groups of, say, four (more or less) each are disposed around the punch k. The upper die, m, is made with a similar diametrically-contracted and axially-elongated cavity, n, and series of groups of cavities o, complementary to the groups of punches or teats r. By means of the punch k and cavity n the cavity p of Fig. 4 is elongated axially and contracted diametrically by the upsetting or drawing of the metal into the shape of and to form the bolt-receiving cavity p' of Fig. 6, and the groups of teats or projections r are formed at the proper points to receive the springs and hold them from lateral displacement when the parts—the upper and lower plates, s and t, the springs u, and the bolt v—are assembled, as in Fig. 7.

The female dies, or those having the recesses, are arranged uppermost, so as to be self-clearing of scale.

The hole $p^2$ in the cavity p' is made by punching in any ordinary way after the formation of the plate or during or before the shaping of such plates and by such shaping instrumentalities or other means as may be most convenient or desirable.

The punches are preferably made removable from the punch head or body of the die to permit renewal or replacement by punches of different size or contour.

My invention is applicable alike to flanged and flangeless plates.

By thus die-shaping or forming car-spring plates I am enabled to produce them in perfect uniformity, all in one piece, cheaply, and quickly.

What I claim is—

1. The manufacture of car-spring plates from wrought metal, consisting in cutting a piece of sheet metal into the desired outline and drawing by the use of dies a bolt-receiving cavity in said plate and integral therewith and of sufficient depth to allow of the free downward movement of the upper plate when the spring is in service, substantially as described.

2. The manufacture of car-spring plates from wrought metal, consisting in first cutting a piece of sheet or plate metal into the desired outline, next partially upsetting or drawing by dies a bolt-receiving cavity in said plate and integral therewith, and finally completing the said bolt-receiving cavity by another set of dies, substantially as described.

3. The process of making wrought-metal plates for car-springs of the class described, the same consisting in cutting the blank from cold sheet or plate metal, next heating the blank and die-drawing a bolt-receiving cavity therein, and again heating the thus-treated blank and contracting and elongating the said cavity, substantially as described.

4. The process of making wrought-metal plates for car-springs, consisting in cutting out the blank, next heating it and die-forming an exaggerated bolt-receiving cavity therein and also completely forming the timber projections thereon, then reheating the thus-treated blank and diametrically contracting and axially elongating and finishing the said cavity, and at the same time forming thereon groups of spring-receiving projections, substantially as described.

In testimony whereof I have hereunto set my hand this 10th day of January, A. D. 1888.

CHARLES T. SCHOEN.

Witnesses:
WM. H. FINCKEL,
EDWIN A. FINCKEL.